United States Patent
Altevogt et al.

(10) Patent No.: US 7,966,332 B2
(45) Date of Patent: *Jun. 21, 2011

(54) METHOD OF GENERATING A DISTRIBUTED TEXT INDEX FOR PARALLEL QUERY PROCESSING

(75) Inventors: Peter Altevogt, Ettlingen (DE); Raiko Nitzsche, Sindelfingen (DE)

(73) Assignee: International Business Machines Corporation, Armonk, NY (US)

(*) Notice: Subject to any disclaimer, the term of this patent is extended or adjusted under 35 U.S.C. 154(b) by 717 days.

This patent is subject to a terminal disclaimer.

(21) Appl. No.: 11/868,757

(22) Filed: Oct. 8, 2007

(65) Prior Publication Data

US 2008/0027918 A1 Jan. 31, 2008

Related U.S. Application Data

(63) Continuation of application No. 10/805,402, filed on Mar. 19, 2004, now Pat. No. 7,324,988.

(30) Foreign Application Priority Data

Jul. 7, 2003 (DE) .................................. 03102028

(51) Int. Cl.
*G06F 7/00* (2006.01)
(52) U.S. Cl. ....................................................... 707/741
(58) Field of Classification Search .................. 707/736, 707/737, 740, 741, 742, 713, 715, 722, 723, 707/730, 748
See application file for complete search history.

(56) References Cited

U.S. PATENT DOCUMENTS

| | | | |
|---|---|---|---|
| 6,795,820 B2* | 9/2004 | Barnett ................................ 1/1 |
| 7,624,274 B1* | 11/2009 | Alspector et al. ............. 713/176 |
| 2003/0225749 A1* | 12/2003 | Cox et al. .......................... 707/3 |
| 2004/0002973 A1 | 1/2004 | Chaudhuri et al. ................ 707/7 |
| 2004/0093323 A1* | 5/2004 | Bluhm et al. ...................... 707/3 |
| 2004/0162824 A1* | 8/2004 | Burns ................................. 707/4 |
| 2004/0172378 A1 | 9/2004 | Shanahan et al. ................. 707/1 |
| 2004/0199419 A1 | 10/2004 | Kim et al. ........................ 705/14 |
| 2009/0234878 A1* | 9/2009 | Herz et al. .................... 707/102 |

* cited by examiner

*Primary Examiner* — Angela M Lie
(74) *Attorney, Agent, or Firm* — Kunzler Needham Massey & Thorpe

(57) ABSTRACT

The present invention relates to a method of generating a distributed text index for parallel query processing by a number of nodes. A set of node indices is generated for text indexing a set of documents, each node text index covering a subset of the documents. For each node text index, a local frequency measure for each term of the node text index is calculated on the basis of a frequency of documents containing the term in the subset of the documents of the node. A global frequency measure for each term is calculated on the basis of a frequency of documents containing the term in the set of documents. A quality measure for each node text index is calculated on the basis of the local frequency measures of the terms of the node and the global frequency measure of the terms of the node.

19 Claims, 4 Drawing Sheets

| 200 ↘ | | | | |
|---|---|---|---|---|
| Term i | Pointer to Document List | $f_i^{local}$ | $f_i^{global}$ | $F_t$ |
| | | | | |
| | | | | |
| | | | | |
| | | | | |
| | | | | |
| | | | | |

- 300 — Loading of Set of Documents
- 302 — Generation of node indices
- 304 — Calculation of $f_i^{local}$
- 306 — Calculation of $f_i^{global}$
- 308 — Calculation of Quality Measure $F_0$
- 310 — Usage of $f_i^{global}$ for Ranking of Documents of a Query

METHOD OF GENERATING A DISTRIBUTED TEXT INDEX FOR PARALLEL QUERY PROCESSING

RELATED APPLICATIONS

This application is a continuation of U.S. patent application Ser. No. 10/805,402 filed Mar. 19, 2004, entitled A METHOD OF GENERATING A DISTRIBUTED TEXT INDEX FOR PARALLEL QUERY PROCESSING, which claims priority to German Patent Application No. 03102028.2, filed Jul. 7, 2003, entitled A METHOD OF GENERATING A DISTRIBUTED TEXT INDEX FOR PARALLEL QUERY PROCESSING.

FIELD OF INVENTION

The present invention relates generally to the field text indices, and more particularly without limitation, to distributed indices for parallel query processing.

BACKGROUND

The development of efficient and effective text retrieval techniques is critical to managing the increasing amount of textual information available in electronic form. Until recently, information retrieval involved relatively small collections of machine readable text in the range of 100 megabytes of data. Networks bring together collections of information in the gigabyte range, and the increased amount of data makes the retrieval process more difficult.

There are two main tasks for text retrieval systems: (1) Identification of terms in documents that should be included in the text index; and (2) After text indexing the terms, determining that a document matches a query. Conventional text retrieval techniques rely on text indexing keywords in documents. Text index terms can be from single words, noun phrases, and subject identifiers derived from syntactic and semantic analysis.

Conventional text retrieval systems for the World Wide Web, such as Yahoo!™ from Yahoo! Inc. and AltaVista™ from Digital Equipment Corporation, use these and other types of keyword text indexing techniques to text index documents available on the web.

Yahoo!, AltaVista, and other conventional text retrieval systems for the web employ programs called "web crawlers" to traverse the web. Web crawlers follow links from page to page and extract terms from all the pages that they encounter. Each search engine then makes the resulting information accessible by providing lists of specific pages that match an input search request or query.

The most common methods for determining whether a document matches a query are the "boolean model" and the "statistical model." According to the boolean model, a match occurs when a document's text index terms meet the boolean expression given by the user. The statistical model, on the other hand, is based on the similarity between statistical properties of the document and the query.

It is not unusual for conventional search engines using either approach to return a large number of matches for a simple query. When faced with a list of 20,000 hits in response to a query—not an uncommon experience when searching the web—a user cannot effectively review all the results. Whether the user accesses the matches serially or randomly, the review process takes an unwieldy amount of time to locate the documents of particular interest.

Typically, Internet web searchers provide the user with the first 10 hits and continue to provide additional blocks of 10 until the user finds something acceptable or gives up. If the user has a simple information need and the answer shows up in the first 10 or 20 hits, then this is not unreasonable. However, if the user has serious research interest in the results, then it may be important to see the information available in the remaining hits.

Consequently, the criteria by which these hits are ranked become very important. More and more systems support some type of ranking feature because users have demanded easy-to-use query languages and ranking to sort out the most important information. Most retrieval techniques provide ranked results with scoring methodologies that depend on statistics of the text indexed document collections.

This means that the scores assigned to documents in different collections, even when using the same scoring methodology, are not commensurate and can not be used as an adequate basis for combining the ranked results from two separate searches. This poses a problem for distributing the text indexing and retrieval processing among multiple nodes.

At the same time, the growing volume of material for text indexing has required search engine designers to focus on techniques for efficiency and volume processing, rather then on techniques for guaranteeing the best possible rankings. The conflict between these two objectives, accurate search results and text indexing huge collections of information, poses a significant problem for the developers of the next generation of text retrieval systems.

SUMMARY OF THE INVENTION

The present invention provides a method of generating a distributed text index for parallel query processing by a number of processing nodes. The global frequency measures of the terms of the node indices of the distributed text index are precalculated when the distributed text index is created.

Further, a quality measure is calculated when the text index is created. The quality measure depends on the global frequency measures of the terms and the local frequency measures of the terms.

The local frequency measures are based on the frequency of documents containing a term in the subset of the documents of a particular node rather than on the entire set of documents covered by the distributed text index. For example, the quality measure for a node text index is obtained by accumulating the differences of the local and global frequency measures of the terms of that node.

The present invention is particularly advantageous in that the precalculation of the global frequency measures is performed at the time of the creation of the distributed text index rather than when a query is processed. This way, the query processing is accelerated and the amount of communication required between the nodes for processing of the query is minimized.

Another advantage is that the precalculated quality measures of the nodes are used to determine if recalculation of the global frequency measures is required when documents are loaded, deleted or reloaded into the text index.

In accordance with a preferred embodiment of the invention rank scores for documents are calculated by means of a scalar product. The scalar product is calculated by means of an inverse document frequency (IDF) value on the basis of the global frequency measure of a term.

BRIEF DESCRIPTION OF THE DRAWINGS

In the following preferred embodiments of the invention will be described in greater detail by making reference to the drawings in which.

DETAILED DESCRIPTION

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Figure 1:
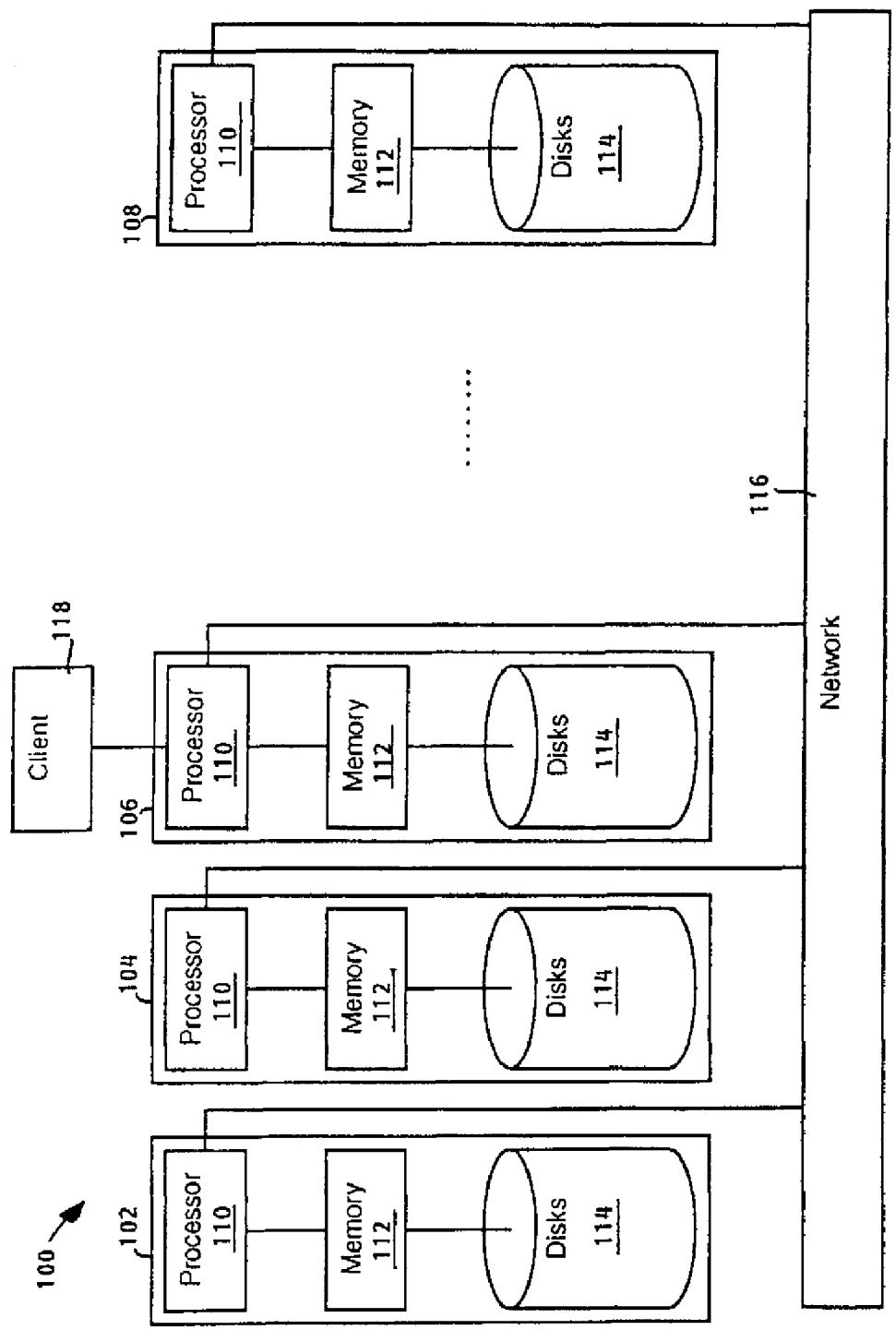
FIG. 1 is a block diagram of an embodiment of a data processing system of the invention.

FIG. 1 shows a data processing system 100 having a number of nodes 102, 104, 106, . . . where one of the nodes acts as rank broker node 108 during administration operations (insert, update, delete of documents); any one of the nodes can act as a client connection node during search operation.

Each one of the nodes 102, 104, 106 . . . , and the rank broker node 108 have one or more processors 110, memory 112 and mass storage 114.

Nodes 102, 104, 106, . . . and rank broker node 108 are interconnected by means of network 116.

A node text index is stored in each one of the memories 112. The combined node indices constitute the distributed text index. The distributed text index covers a certain set of documents, whereby each one of the node indices covers at least a subset of the complete set of documents.

In the example considered here client computer 118 is coupled to data processing system 100 via client connection node 106. When client computer 118 sends a query to client connection node 106 the query is processed in parallel on the nodes 102, 104, . . . and client connection node 106. The hit lists and rank scores of documents which are generated by each one of the parallel nodes are combined by client connection node 106 into one hit list being sorted in accordance with the rank scores.

The calculation of the rank scores of individual parallel nodes 102, 104, 106, . . . is based on precalculated global frequency measures of the text index terms contained in the respective node indices. As a consequence the global frequency measures do not need to be calculated for the query processing which considerably enhances the query response time of data processing system 100.

Figures 2, 3:
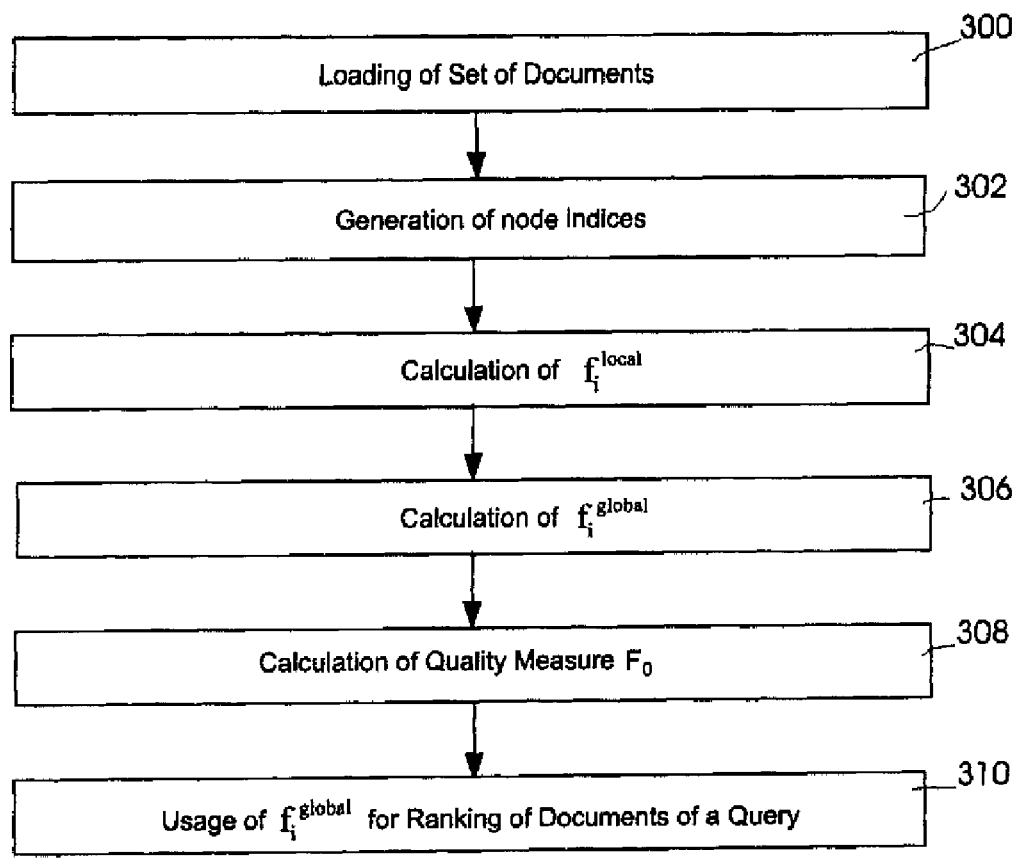
FIG. 2 is illustrative of a node text index of a distributed text index of the data processing system of FIG. 1.
FIG. 3 is illustrative of a flow chart for generating of the distributed text index.

FIG. 2 shows the structure of one of the node indices 200. For example, node text index 200 is the node text index of node 102 and is stored in memory 112 of that node. The other parallel nodes 104, 106, . . . have node indices of the same structure.

Node text index 200 contains a list of terms i. Each one of the terms has an assigned pointer to a document list. The document list contains references, such as the uniform resource locators (URLs) of documents in which the term occurs.

Further the precalculated global frequency measure for each one of the terms is stored in node text index 200. The global frequency measure can be calculated by calculating a measure for the absolute number of documents containing a given term i in the set of documents covered by the distributed text index and normalizing this number.

This global frequency measure is the basis for calculating of rank scores as it will be explained in greater detail in the following.

Further a quality measure $F_t$ is stored for node text index 200. The quality measure $F_t$ is expressive of the accumulated differences of the global frequency measures and the local frequency measures of the terms in node text index 200.

The local frequency measures are calculated in a similar way as the global frequency measures with the difference that only the subset of the documents covered by node text index 200 forms the basis for the calculation and not the entire set of documents which is covered by the distributed text index.

The advantage of precalculating of the global frequency measures is that these measures need not to be calculated for processing of a query which minimizes the amount of communication required between the parallel nodes and thus shortens the processing time of the query.

For example, ranking is based on a scalar product $R_{QD}$ which provides a rank score for a given query Q and a document D. Q is represented by the query vector with components $q_i$(i=1, . . . m) and D by the document vector with components $d_i$(i=1, . . . m), where m is the number of terms in the global vocabulary of the combined node indices of the processing nodes. Those terms of the distributed text index which are contained in the query Q are represented by "1" and those which are not by "0" in the query vector.

In terms of these component vectors $R_{QD}$ is then defined as follows:

$$R_{QD} = \langle Q, D \rangle = \frac{1}{|q_i||d_i|} \sum_i q_i d_i$$

The precise definition of the vector components $q_i$ and $d_i$ varies (cf. Ricardo Baeza-Yates, Berthier Ribeiro-Neto: "Modem Information Retrieval", Addison Wesley Longman Limited (1999), Michael W. Berry, Murray Browne: "Understanding Search Engines: Mathematical Modeling and Text Retrieval", SIAM (1999)).

The vector components $q_i$ are in general simple functions of the query (e.g. simply a value of one for a vector component associated with a query term), while the vector components $d_i$ are in general functions of terms local to the document under consideration (e.g. the within-document term frequencies) as well as of global term weights $g_i$ depending on statistical data distributed over all nodes of the parallel system. As an example for a local term weight we consider the normalized frequency $l_{i,d}$ of term i in document D. As an example for these global term weights we consider the "Inverse Document Frequency" (idf):

$$g_i = \log(1/f_i^{global})$$ (2)

with $$f_i^{global} = \frac{1}{n^{global}} \sum_j \chi(f_{ij}).$$ (3)

being the global frequency measure of term i, $n^{global}$ being the total number of documents (on all nodes of the cluster) and $f_{ij}$ denoting the frequency of term i in document j and $$\chi(r) = \begin{cases} 1 & \text{if } \ldots r > 0, \\ 0 & \text{if } \ldots r = 0. \end{cases}$$

and the sum extending over all documents on all nodes of the cluster.

The document vector components $d_i$ for a document D can then be calculated as follows:

$$d_i = 1_{id} g_i.$$

On this basis the scalar product $R_{QD}$ is calculated as the rank score of the document D.

It is important to note that the values for $f_i^{global}$ can be obtained by performing a lookup operation in node text index 200 which avoids calculations and communication overhead for the global statistics between the parallel nodes during execution of search operations. Another advantage is that the rank value can also be calculated in parallel such that a bottle neck which would otherwise be created by a central rank node is avoided.

For each term i of the distributed text index, the local document frequencies are calculated as follows:

$$f_i^{local} = \frac{1}{n^{local}} \sum_j \chi(f_{ij}),$$ (4)

where $n^{local}$ is the number of documents in the subset of the documents covered by the node text index 200.

The quality measure $F_t(t=0)$ for node 200 is calculated as follows:

$$F_t = \frac{1}{n^{local}} \sum_i |f_i^{local} - f_i^{global}|$$ (5)

with i=1, ..., $n^{local}$, and $F_0 \in [0,1]$ as a quality measure for the deviation of the local document frequency weights from the global document frequency weights at each node at time t=0.

The quality measures $F_0$ and the global weights $f_i^{global}$ are calculated for each node and stored in the node indices.

FIG. 3 shows a flow chart which illustrates the generation of the distributed text index. In step 300 a set of documents is loaded. In step 302 a set of node indices is generated by parallel processing by means of the parallel processing nodes of the data processing system. This way a node text index is created for each one of the nodes which contains a list of terms which occur in the subset of the documents covered by that node text index as well as pointers to corresponding documents lists (cf. node text index 200 of FIG. 2).

In step 304 the local frequency measure $f_i^{local}$ for each one of the terms i in one of the node indices is calculated, e.g. in accordance with equation 4. Likewise, in step 306 the global frequency measures $f_i^{global}$ for all of the terms i is calculated e.g. in accordance with equation (3).

In step 308 the quality measure $F_t$ at time t=0 is calculated on the basis of the local and global frequency measures of the terms covered by a given node text index. For example this calculation can be performed in accordance with equation (5).

After the steps 304, 306, 308 have been performed for all node indices the distributed text index is ready for usage. When a query is processed in step 310 the global frequency measures $f_i^{global}$ of the terms which have been precalculated in step 306 are used for calculating of rank scores.

Figure 4:
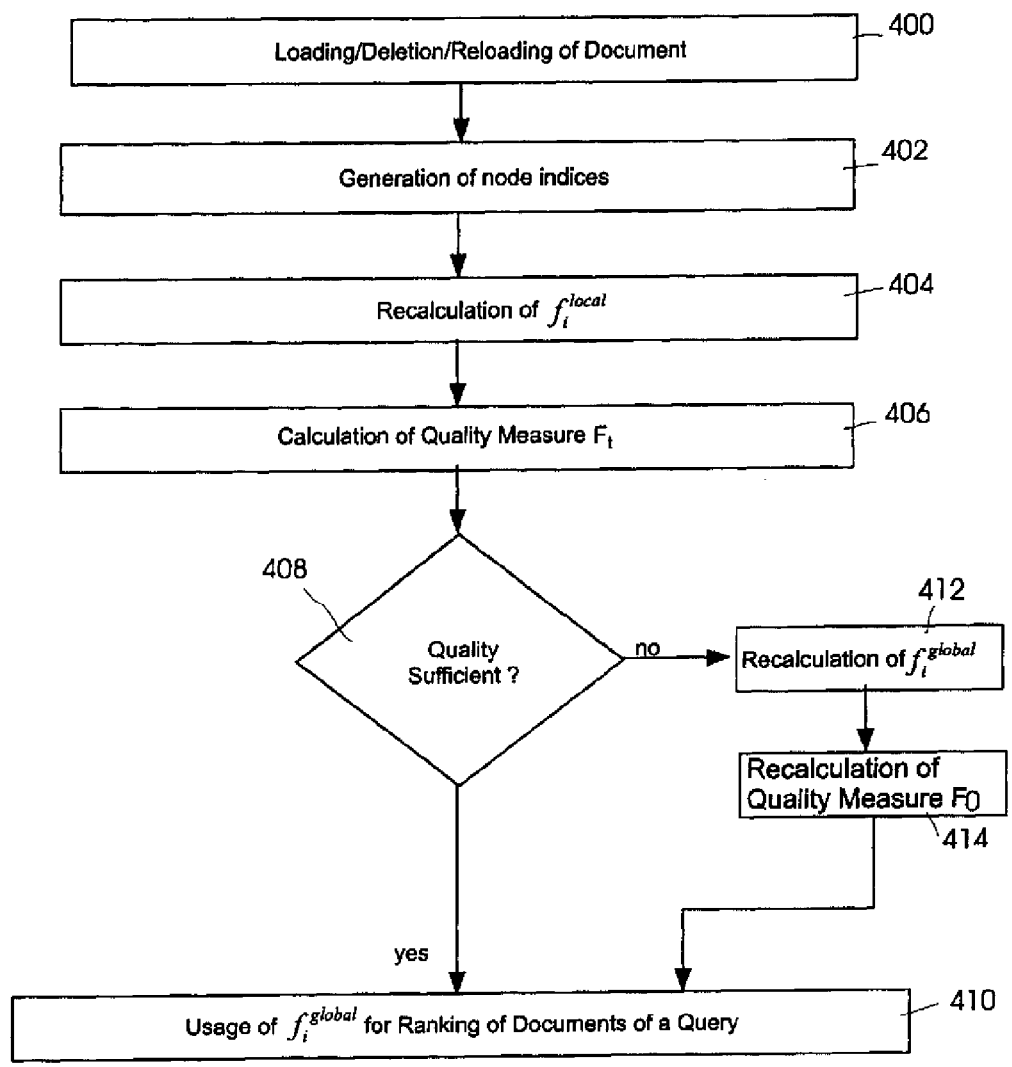
FIG. 4 is illustrative of a method for updating of the distributed text index.

FIG. 4 is illustrative of an updating operation of the distributed text index.

In step 400 a document is loaded, deleted or reloaded. This requires that the document lists of the node indices need to be updated. This is done in step 402.

In step 404 the local quality measures $f_i^{local}$ of the terms i are recalculated in accordance with equation (4). This can be done locally by each node as the information for evaluating equation (4) is available locally at each node.

In step 406 the quality measures Ft are calculated by the nodes in accordance with equation (5).

In step 408 the quality measures $F_t$ of the nodes and the quality measures $F_0$ are compared in order to determine whether the quality of these statistics measures is still sufficient. If this is the case the precalculated global frequency measures $f_i^{global}$ can continue to be used for the ranking of documents.

If it is determined in step 406 that the quality of the distributed text index is no longer sufficient as a result of the modification of the set of documents the control goes to step 412 where the global frequency measures $f_i^{global}$ of all terms i are recalculated for the modified set of documents in accordance with equation (3).

Likewise the quality measures $F_t$ are recalculated in step 414 in accordance with equation (5), where t is reset to 0. The values for the global frequency measures $f_i^{global}$ and the quality measures $F_0$ are stored in the respective node indices in order to replace the respective former values. After this updating operation the control goes to step 410 in which the updated distributed text index is used for processing of queries.

It is to be noted that this updating method minimizes the amount of processing resources required as the global frequency measures need only to be recalculated if the quality of the distributed text index has deteriorated to an unacceptable level. If the quality is still sufficient the global frequency measures $f_i^{global}$ which have been calculated for the original set of documents can be reused.

Figure 5:
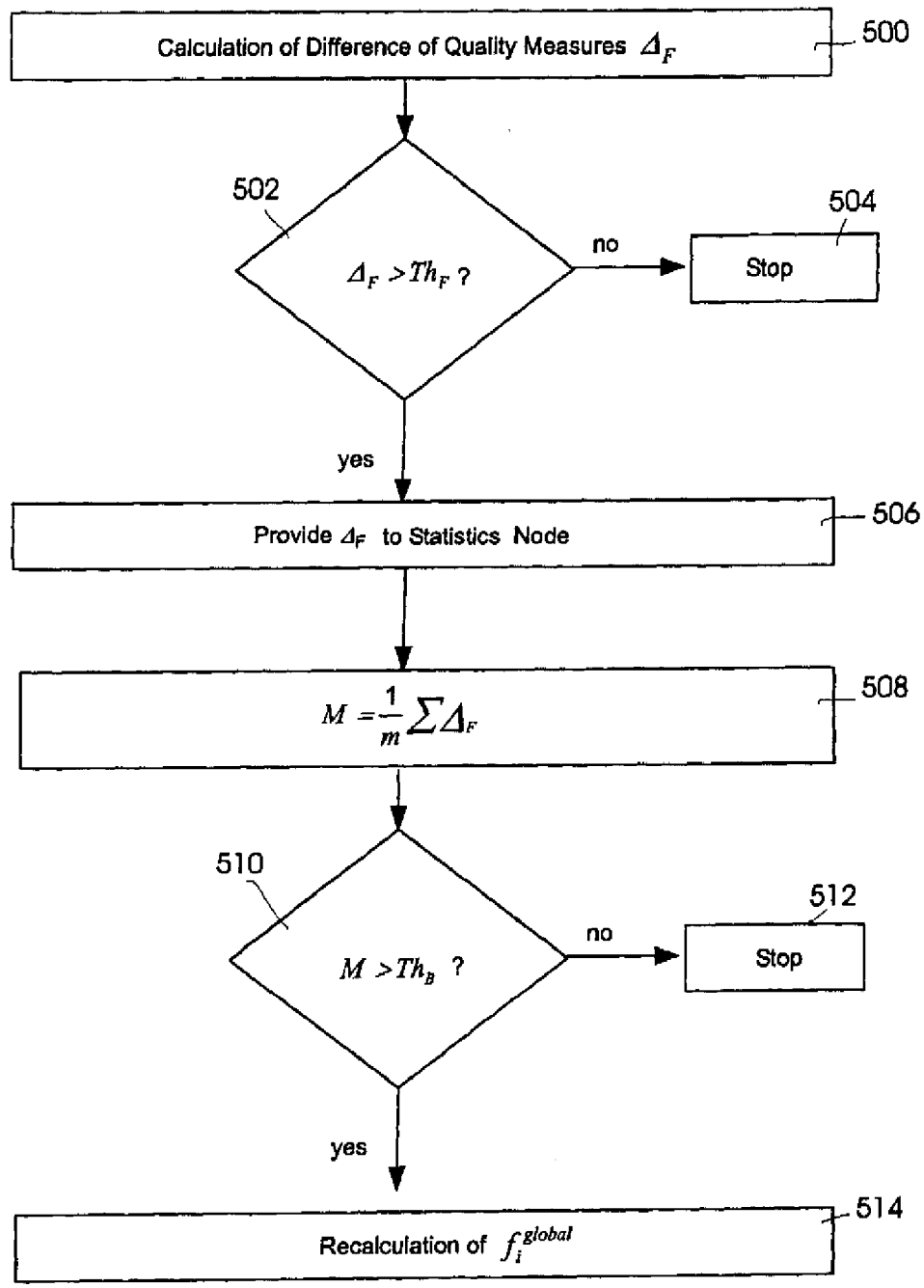
FIG. 5 is illustrative of a method for determining whether recalculation of the global frequency measures is required for the updating of the distributed text index.

FIG. 5 illustrates how the determination in step 408 (cf. FIG. 4) can be made.

In step 500 the absolute values of the difference of the quality measures $F_t$ and $F_0$ are calculated at each node:

$$\Delta_F = |F_t - F_0|$$ (6)

with $\Delta_F \in [0,1]$.

If $$\Delta_F > Th_F,$$ (7)

with a user defined global threshold $Th_F \in [0,1]$, the $\Delta_F$ value is communicated from the respective node to the rank broker node (step 506). If the contrary is the case the $\Delta_F$ value is not reported (step 504).

Steps 500 to 506 are performed in parallel by each node of the data processing system.

In step 508 the rank broker node calculates the mean of the reported deviations:

$$M = \frac{1}{m} \sum \Delta_F, \quad (5)$$

where m denotes the number of nodes.

In step 510 the rank broker node checks whether this mean is bigger than the user specified threshold $Th_B \in [0,1]$:

If $$M > Th_B \quad (8)$$

the rank broker node initializes a global recalculation of the global frequency measures $f_i^{global}$ at all nodes.

It is to be noted that the functionality of the rank broker node 108 can be split as far as client access is concerned. It is not essential whether the client is coupled to the data processing system through the rank broker node 108 or through anyone of the other nodes or a separate access point.

Taken in combination flow diagrams depicted in FIG. 3, 4 and 5 in conjunction with supporting diagrams and detailed descriptions provide for generating distributed text indexes for parallel query processing. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. ' 112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not to the specific details disclosed in the exemplary embodiments.

What is claimed:

1. A computer program product comprising a computer program stored in a memory and executed by a processor to perform operations for generating a distributed text index for parallel query processing by a number of nodes, the operations of the computer program product comprising:
   generating a set of node indices for text indexing a set of documents, each node text index covering a subset of the documents;
   for each node text index: calculating a local frequency measure for each term of the node text index on the basis of a frequency of documents containing the term in the subset of the documents of the node;
   calculating a global frequency measure for each term on the basis of a frequency of documents containing the term in the set of documents; and
   calculating a quality measure for the node text index as a mean value of each difference for each term of the node of the local frequency measure of the term and the global frequency measure of the term, wherein the quality measure indicates a validity of the global frequency measure for each node text index.

2. The computer program product of claim 1, the operations further comprising:
   using the global frequency measures for calculating of rank scores if the mean value of the differences is not above a user-defined threshold level; and
   recalculating of the global frequency measures and the quality measure of the nodes if the mean value of the differences is above the user-defined threshold level.

3. The computer program product of claim 2, wherein only differences which are above a predefined second threshold level are used for the calculation of the mean value.

4. The computer program product of claim 2, wherein calculating the quality measure for each node text index is performed in parallel.

5. A method for parallel query processing, the method comprising:
   providing, by use of a processor, a set of node indices for text indexing a set of documents, each node text index covering a subset of the documents, each term of the node indices having an assigned precalculated global frequency measure, the global frequency measure being expressive of a frequency of documents containing the term in the set of documents and each node text index having an assigned precalculated quality measure, the quality measure calculated as a mean value of each difference for each term of the node between the global frequency measure of the term and a local frequency measure of the term within the subset of documents covered by the node, wherein the quality measure indicates a sufficiency of the global frequency measure for each node text index; and
   calculating of rank scores on the basis of the global frequency measures.

6. The method of claim 5, the method further comprising:
   using the global frequency measures for calculating of rank scores if the mean value of the differences is not above a user-defined threshold level; and
   recalculating of the global frequency measures and the quality measure of the nodes if the mean value of the differences is above the user-defined threshold level.

7. The method of claim 6, wherein only differences which are above a predefined second threshold level are used for the calculation of the mean value.

8. The method of claim 7, wherein calculating the quality measure for each node text index is performed in parallel.

9. A computer program product comprising a computer program stored in a memory and executed by a processor to perform operations for updating a distributed text index for parallel query processing by a number of nodes, the distributed text index having a set of node text indices indexing a set of documents, each node text index covering a subset of the documents, the operations of the computer program product comprising:
   for each node text index: calculating a local frequency measure for each term on the basis of a frequency of documents containing the term in the subset of the documents of the node; and
   calculating a quality measure for each node text index as a mean value of each difference for each term of the node of the local frequency measure of the term and a precalculated global frequency measure of the term, wherein the global frequency measure has been calculated before the updating of the text index, the global frequency measure of the term being expressive of a frequency of documents containing the term in the entire set of documents, wherein the quality measure indicates a sufficiency of the global frequency measure for each node text index.

10. The computer program product of claim 9, the calculation of the mean value being performed by a rank broker node, whereby the difference is communicated from one of the nodes to the rank broker node only if the difference surpasses the second predefined threshold.

11. The computer program product of claim 9, the operations further Comprising:
  using the global frequency measures for calculating of rank scores if the mean value of the differences is not above a user-defined threshold level; and
  recalculating of the global frequency measures and the quality measure of the nodes if the mean value of the differences is above the user-defined threshold level.

12. The computer program product of claim 11 wherein only differences which are above a predefined second threshold level are used for the calculation of the mean value.

13. The computer program product of claim 12, the calculation of the mean value performed by a rank broker node, whereby the difference is communicated from one of the nodes to the rank broker node only if the difference surpasses the second predefined threshold.

14. The computer program product of claim 12, wherein calculating the quality measure for each node text index is performed in parallel.

15. A data processing system comprising a computer program stored in memory, executed by a processor, and having a number of nodes for parallel query processing, each node having a node text index for text indexing a subset of documents of a set of documents covered by a distributed text index, and each term of a node text index having an assigned precalculated global frequency measure, the global frequency measure being expressive of a frequency of documents containing the term in the entire set of documents, and each of the node indices having an assigned precalculated quality measure depending on the global frequency measure of the terms and the local frequency measure of the terms of the node, the local frequency measures of the terms being expressive of a frequency of documents containing a term in the subset of the documents covered by the node text index, the computer program executed on the processor performing the operations of:
  for each node text index: calculate a local frequency measure for each term on the basis of a frequency of documents containing the term in the subset of the documents of the node; and
  calculate a quality measure for each node text index as a mean value of each difference for each term of the node of the local frequency measure of the term and a precalculated global frequency measure of the term, wherein the global frequency measure has been calculated before the updating of the text index, the global frequency measure of the term being expressive of a frequency of documents containing the term in the entire set of documents, wherein the quality measure indicates a sufficiency of the global frequency measure for each node text index.

16. The data processing system of claim 15, further comprising a rank broker node for calculating the mean value.

17. The data processing system of claim 15, the operations further comprising:
  using the global frequency measures for calculating of rank scores if the mean value of the differences is not above a user-defined threshold level; and
  recalculating of the global frequency measures and the quality measure of the nodes if the mean value of the differences is above the user-defined threshold level.

18. The data processing system of claim 17 wherein only differences which are above a predefined second threshold level are used for the calculation of the mean value.

19. The data processing system of claim 18, wherein calculating the quality measure for each node text index is performed in parallel.

* * * * *